(12) United States Patent
Cooper et al.

(10) Patent No.: US 9,397,936 B2
(45) Date of Patent: Jul. 19, 2016

(54) SOURCE-BASED NETWORK ROUTING

(71) Applicant: Verizon Patent and Licensing Inc., Arlington, VA (US)

(72) Inventors: Bradley D. Cooper, Southfield, MI (US); Kenneth M. Potas, Southfield, MI (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 134 days.

(21) Appl. No.: 14/453,060

(22) Filed: Aug. 6, 2014

(65) Prior Publication Data

US 2016/0043945 A1 Feb. 11, 2016

(51) Int. Cl.
*G01R 31/08* (2006.01)
*H04L 12/721* (2013.01)
*H04L 12/707* (2013.01)

(52) U.S. Cl.
CPC ............... *H04L 45/72* (2013.01); *H04L 45/22* (2013.01); *H04L 45/34* (2013.01)

(58) Field of Classification Search
None
See application file for complete search history.

(56) References Cited

U.S. PATENT DOCUMENTS

| | | | |
|---|---|---|---|
| 7,046,692 B1* | 5/2006 | Gradischnig | H04Q 11/0478 370/467 |
| 2003/0139175 A1* | 7/2003 | Kim | H04L 69/16 455/419 |
| 2008/0207235 A1* | 8/2008 | Choi | H04W 4/14 455/466 |
| 2010/0331001 A1* | 12/2010 | Cai | H04L 12/5855 455/445 |

* cited by examiner

*Primary Examiner* — Bob Phunkulh

(57) ABSTRACT

A message center for source-based message routing may include a processor and a memory communicatively connected to the processor. The processor may be configured to receive a first message having a first message transfer layer indicating a first destination address and a first message transaction layer, receive a second message having a second message transfer layer indicating a second destination address and a second message transaction layer indicating an alternate routing, read at least the first message transfer layer of the first message, read at least the second message transaction layer of the second message, route the first message based in part on the first destination address of the first message transfer layer, and route the second message based in part on the second destination address of the second message transfer layer and the alternate routing of the second message transaction layer.

17 Claims, 5 Drawing Sheets

SOURCE-BASED NETWORK ROUTING

BACKGROUND

Communication networks may include a message center (e.g., short message service center (SMSC)) that supports messaging services (e.g., a short message service (SMS) also referred to as text messaging). However, traditional message centers do not have the ability to determine whether a message was initiated by a human (e.g., using a first application such as a text messaging application or a user interface of a first device) or a machine (e.g., using a second application of the first device or a second device in communication with the first device). For example, typical messaging services do not have the ability to distinguish between a first message that originates from the first application (e.g., a text messaging application of the first device) and a second message that originates from the second application (e.g., a background application of the first device or an application in communication with a bulk messaging system or a telematics or tethered device). As a result, there is a need to distinguish between messages that are initiated by a human and a machine. This may allow for enhanced control over the routing, priority, billing, and screening of messaging services, for example, to reduce unauthorized activities associated with particular devices or generate revenue from particular applications.

DETAILED DESCRIPTION

Figure 1:
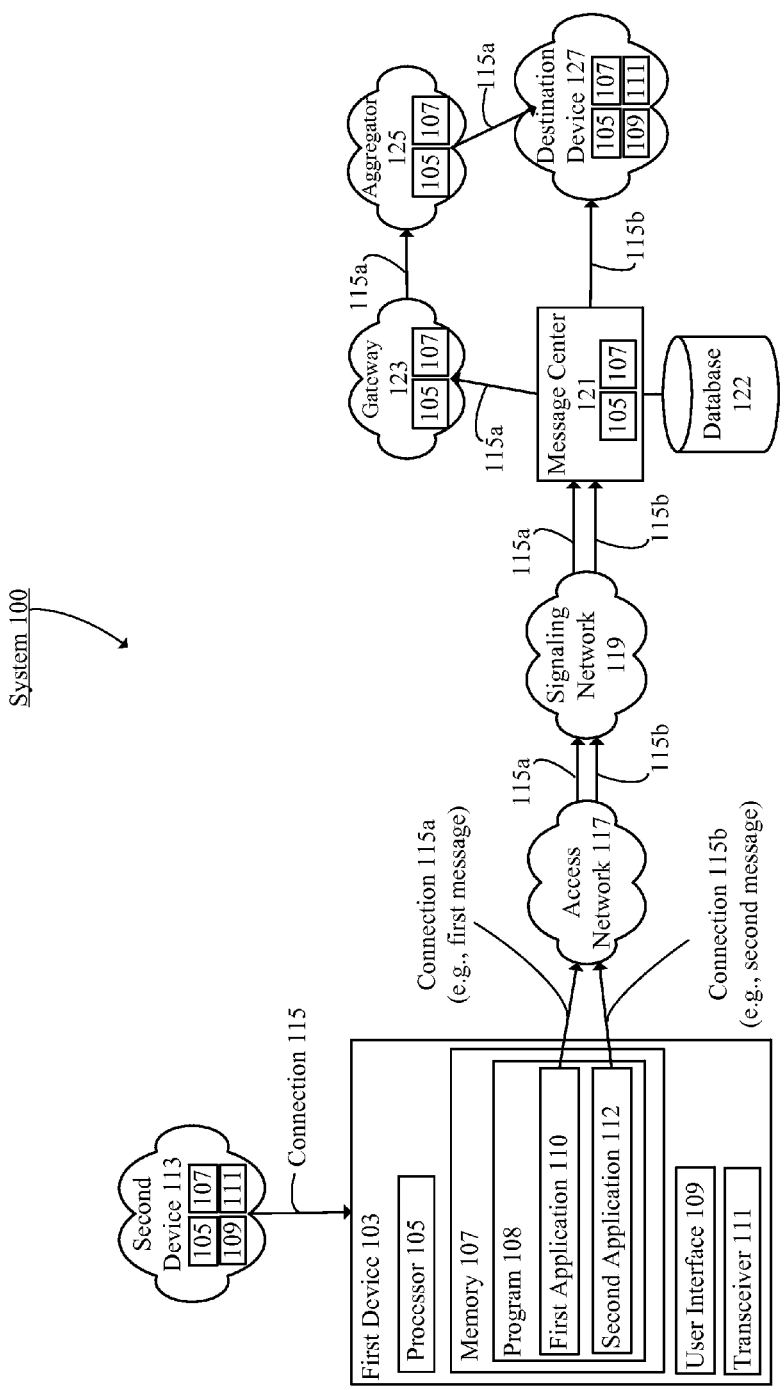
FIG. 1 illustrates an exemplary routing system of the present disclosure.

A message center may be configured to transfer messages between an origination address and a destination address. The messages may include various forms of electronic communication such as electronic messaging (e-mail), text messaging including Short Message Service (SMS), Multimedia Messaging Service (MMS), and Rich Communication Services (RCS) Chat, voice messaging, etc. The origination address may include a long code (e.g., a telephone number) or a short code (e.g., abbreviated numeric or alphanumeric code associated with the telephone number) of a first device connected to an access network. The destination address may include a long or short code associated with a destination for messages. The origination address may be used to identify a first device connected to the access network, but may not indicate a message source that generated the message.

The message center may be configured to distinguish between messages initiated by a human (e.g., using a first application such as a text messaging application or a user interface of a first device) or a machine (e.g., using a second application such as a background application of the first device or a second device in communication with the first device). The messages may include a first message generated from the first application of a first device or a second message generated from a second application of the first device or a second device in communication with the first device. For example, the message source of the first message may include a first application of the first device configured to generate first messages with a user interface of the first device. Alternatively, the message source of a second message may include a second application such as a background application as part of the first device or an application that is configured to distribute second messages from one or more second devices using the connection of the first device to the access network. In either case, the origination address is associated with the first device, not necessarily the message source. Thus, the message source may be beneficial for enhanced message routing.

The messages may include a transfer layer, a signaling layer, and a transaction layer. The transfer layer may include a protocol (e.g., a message transfer part (MTP)) configured to provide basic routing information such as an origination address and a destination address as well as error detection between providers of communication services. The signaling layer may include a protocol (e.g., a signaling connection control part (SCCP)) configured to provide routing, flow control, segmentation, connection-orientation, and error correction facilities to a signaling network. The transaction layer may include a protocol (e.g., a transaction capabilities application part (TCAP)) configured to facilitate the transfer of a payload (e.g., message content) and a teleservice ID, which may indicate a message type (e.g., a default teleservice ID). The transaction layer may also be populated (e.g., using a processor of the first or second device) with a teleservice ID (e.g., a first or second teleservice ID) associated with a message source. In addition, the messages may include protocols such as session initiation protocol (SIP), rich communication services (RCS) chat, and network attached storage (NAS). Thus, the teleservice ID may be utilized to identify the message source and route the message according the message source.

FIG. 1 illustrates an exemplary system 100 for the transfer and routing of messages. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, an exemplary system 100 may include a first device 103, a second device 113, a connection 115, an access network 117, a signaling network 119, a message center 121, a database 122, a gateway 123, an aggregator 125, and a destination device 127. The devices 103, 113, and 127, message center 121, gateway 123, and aggregator 125 may include a processor 105 and a memory 107. The memory 107 may include a program 108 having one or more first applications 110 and one or more second applications 112. The devices 103, 113, and 127 may further include a user interface 109 and a transceiver 111.

System 100 may include an overall network infrastructure through which the first device 103, the second device 113, the access network 117, the signaling network 119, the message center 121, the gateway 123, the aggregator 125, and the destination device 127 may communicate, for example, messages. For instance, the network infrastructure may generally include edge, distribution, and core devices (e.g., access network 117, signaling network 119, and the message center 121) and enables a path (e.g., connections 115) for the exchange of information (e.g., messages) between different devices and systems (e.g., between the devices 103, 113, and 127). In general, a network infrastructure comprising system 100 may be a collection of computers and other hardware to establish physical connections and provide the mechanical mechanisms to carry (e.g., transmit and receive) communications.

The devices 103, 113, and 127 may include any device configured to receive, generate, or send an electronic message. The devices 103, 113, and 127 may be configured to exchange messages with each other. Exemplary devices 103, 113, and 127 may include, without limitation, a mobile device, cellular phone, a smart-phone, a super-phone, a tablet computer, a next generation portable device, a handheld computer, a secure voice communication equipment, networking hardware, or some other computing system and/or device. The devices 103, 113, and 127 may also include a computer workstation, a server, a desktop, a notebook, a laptops, or any other computing system and/or device.

The processor 105 may be configured to receive instructions from memory 107 and execute the instructions, thereby performing one or more processes, including one or more of the processes described herein. Such instructions and other data may be stored and transmitted using a variety of computer-readable mediums (e.g., memory 107 and database 122). Processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

The memory 107 and database 122 may include any computer-readable medium (also referred to as a processor-readable medium) that may include any non-transitory (e.g., tangible) medium that participates in providing data (e.g., instructions) that may be read by a computer (e.g., by the processors 105). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The program 108 may be configured to generate, send, and receive messages from any computing system or device (e.g., the first device 103). The program 108 may include one or more first applications 110 (e.g., installed by a manufacturer or installed along with an operating system such as a text messaging application) and one or more second applications 112 (e.g., installed by a user or subsequent to an operating system such a background application, web application, or a hybrid application). The first application 110 may be adapted for a particular type of computing device (e.g., the first device 103) and may include a native application installed as part of the computing device (e.g., the memory 107 of the first device 103). The second application 112 may be generalized for multiple types of computing devices (e.g., including the first device 103) and may include a background application (e.g., an application configured to use the processor 105 and memory 107 but not necessarily the user interface 109), a web application (e.g., not installed locally as part of first device 103 and available through an internet browser), or hybrid application (e.g., installed locally as part of the first device 103 and including an embedded internet browser). The first application 110 may be configured to receive a message (e.g., message content from a user) generated by the user interface 109, write to or populate the message (e.g., a first teleservice ID to a transaction layer of the message, as discussed in further detail below) using processor 105, and send the message to the access network 117. The second application 112 may be configured to receive a message generated by the second device 113, write to the message (e.g., a second teleservice ID to a transaction layer, as discussed in further detail below) using the processor 105, and send the message to the access network 117. Thus, the program 108 may be configured to specify a first teleservice ID for the first application 110 and a second teleservice ID for the second application 112, thereby allowing subsequent routing by the message center 121 (e.g., based on teleservice ID), as discussed in more detail below.

The user interface 109 may include a display, support user interfaces, and/or any device configured to communicate data between a user and the first device 103. A display may include any input-output device for the receipt and presentation of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, touch display, and the like. Thus, the display may present user interfaces or a web portal to a user, such that the user may interact with and receive information from other devices of system 100.

Transceiver 111 may communicatively connect the devices of system 100, for example, using any type of wired or wireless network connection. The wireless network may utilize a wireless transmitter (e.g., cellular, radiofrequency (RF) or Wi-Fi transmitter) of transceiver 111. Transceiver 111 may be configured to communicatively connect first device 103, second device 113, access network 117, and destination device 127, for example, using connections 115. Transceiver 111 may be used for digital or analog signal transfers. For instance, transceiver 111 may include any antenna technology including cellular, radiofrequency (RF), near field communication (NFC), Bluetooth®, Wi-Fi, or the like. Transceiver 111 may include any technology that implements a wireless exchange of messages by converting propagating electromagnetic waves to and from conducted electrical signals. Transceiver 111 may include any technology that is used to exchange messages wirelessly using radio waves over a radio range or network that enables communication.

The second device 113 may include any computing device or system configured to send an electronic message. The second device 113 may be configured to communicatively connect with the first device 103 (e.g., using connection 115) and send a message using the access network 117 connected to the first device 103. The second device 113 may connect to the first device 103 using the second application 112 and connection 115. For example, the second device 113 may include a bulk messaging system such as a SMS publication system, which may include a computing system configured connect to a second application 112 (e.g., bulk messaging software) of the first device 103 (e.g., using a connection 115). For instance, the second application 112 may utilize an application programming interface (API) configured to transfer a plurality of messages using a file transfer protocol (FTP), a short message peer to peer (SMPP), a hypertext transfer protocol (HTTP) link, or an e-mail. Upon receiving the plurality of messages, the second application 112 instructs the first device 103 to distribute the plurality of messages using the access network 117.

The second device 113 may also include a telematics or a tethered device. The telematics device may include any computing device or system configured to provide telematics services, for example, using location information of a global positioning system (GPS) and a communication service of a first device 103 connected to an access network 117. Using the location information and the communication service, the telematics service may provide automatic driving assistance, vehicle tracking, container tracking, cold storage tracking, fleet management, safety information (e.g., road hazard or weather notifications), emergency warning information (e.g., emergency vehicle notifications), and vehicle status (e.g., notification of an airbag deployment, mileage indicators, or system issues such as transmission failure). The tethered device may include any device in wireless or wired communication with the first device 103.

The connections 115 may be any wired or wireless connections between two or more endpoints (e.g., devices or systems), for example, to facilitate transfer of messages. The connections 115 may include any antenna or data cable technology, as discussed herein. The connections 115 may communicatively connect first device 103, second device 113, access network 117, signaling network 119, message center 121, gateway 123, aggregator 125, and destination device 127.

System 100 may utilize a network infrastructure as discussed above with any networking technology. System 100 may utilize any wired or wireless network or networks. Each network may include a packet network or any other network having an infrastructure to carry communications. Exemplary networks may include one or more of a cellular network, telephone network (e.g., public switched telephone network (PSTN)), global area network, wide area networks, a VoIP network, a VoLTE (Voice over LTE) network, fiber optic network, cable network, television network, local area networks (e.g., Ethernet), wireless local area networks (e.g., radio-frequency (RF) or Wi-Fi), power-line networks, or combinations thereof. The network infrastructure may further include a direct wired connection, for example, any data cable technology connecting two or more devices (e.g., using a universal serial bus (USB) or serial port). Although a single system 100 is illustrated, the system 100 may represent a single network, a combination of different networks components and technologies, and/or a plurality of networks.

The access network 117 may be configured to provide communications services to a plurality of devices (e.g., one or more first devices 103). The access network 117 may include any radio access network configured to exchange information wirelessly using radio waves over a radio range or network that enables communication. The access network 117 may implement any radio access technology including, for example, cellular, 3G, 4G, long-term evolution (LTE), radiofrequency (RF), near field communication (NFC), Bluetooth®, or Wi-Fi. The access network 117 may be configured to route messages (e.g., using connection 115) between the first device 103 and the signaling network 119.

The signaling network 119 may include set of telephony signaling protocols (e.g., signaling system no. 7 (SS7)) for a public switched telephone network (PSTN). The signaling network 119 may be configured to provide short message services (SMS), set up and tear of down telephone calls, number translation, local number portability, and prepaid billing mechanisms. The signaling network 119 may also include a session initiation protocol (SIP). The signaling network 119 may be configured to route messages between the access network 117 and the message center 121.

The message center 121 may be configured to allow devices (e.g., devices 103 and 127) to exchange messages (e.g., SMS messages). The message center 121 may include a short message service (SMS) or any text messaging service component of phone, Web, or communication system. The message center 121 (e.g., using processor 105) may utilize communication protocols such as a teleservice layer protocol (e.g., an international standard protocol such as IS-637) and a cellular telecommunication protocol (e.g., an American National Standards Institute protocol such as ANSI-41) to facilitate the exchange of text messages between fixed line or mobile devices. The message center 121 may also utilize communications protocols for mobility management entities (MME) such as 3rd Generation Partnership Project (3gPP) or 3rd Generation Partnership Project 2 (3gPP2). The message center 121 may be configured to receive and store (e.g., as part of memory 107 or database 122) as well as forward and deliver text messages (e.g., using processor 105). For example, the message center 121 may be configured for 2G SMS (e.g., using ANSI-41 over SS7), 3G MMS (e.g., using 3gPP2 over hypertext transfer protocol (HTTP)), 4G SMS (e.g., using ANSI 41 over SIP), 4G MMS (e.g., 3gPP2 over HTTP), 4G RCS Chat (e.g., using SIP or real-time transport protocol (RTP)), and 4G NAS (e.g., a signaling protocol between a message center and an MME).

The message center 121 may configured to utilize the teleservice ID to determine a message type or a message source. The message may include a default teleservice ID indicating a message type or a first or second teleservice ID indicating a message source. The message source may include a user of first device 103 or a second device 113 in communication with the first device 103. The message source may be indicated by a first teleservice ID associated with the first application 110 or a second teleservice ID associated with the second application 112. For example, the first or second teleservice ID may be utilized to determine if the message was sent by first device 103 (e.g., using user interface 109 or first application 110) or a second device 113 (e.g., using the second application 112 or connection 115), respectively.

To determine the message source, the message center 121 may compare the teleservice ID to a teleservice record as part of memory 107 or database 122. The teleservice record may define the routing, priority, billing, and screening associated with the first and second applications, e.g., specified according to respective first and second teleservice IDs. The message center 121 may receive a message, read the teleservice ID from the transaction layer, and compare the teleservice ID to the teleservice record. Based on routing, priority, billing, and screening specified for the first or second teleservice ID as part of the teleservice record, the message center 121 (e.g., using the processor 105) may apply routing, priority, billing, and screening to the message, as described in further detail below.

With the message source, the message center 121 may route the message to the gateway 123 or the destination device 127. If the message includes a default teleservice ID, the message center 121 may apply default routing and route the message to gateway 123, aggregator 125, and then to destination device 127. If the message includes a first or second teleservice ID, the message center 121 may apply an alternate routing and route the message to the destination device 127, bypassing the gateway 123 and aggregator 125. Thus, the teleservice ID may be utilized to selectively route messages to the gateway 123 or to the destination device 127, bypassing the gateway 123 and the aggregator 125, based on the teleservice ID.

The gateway 123 may include an SMS gateway or any other computing system configured to receive messages from the message center 121 and translate the message into a protocol (e.g., referred to as a universal protocol) configured for distribution to mobile devices of different networks. The gateway 123 may utilize protocols such as short message peer-to-peer (SMPP), hypertext transfer protocol (HTTP), simple mail transfer protocol (SMTP), and other web service protocols. To translate messages between two or more networks (e.g., two or more message centers 121 having different protocols), the gateway 123 may include one or more protocol translators (e.g., using processor 105 configured to convert a standard or proprietary protocol of a message source to the universal protocol), impedance matching devices (e.g., using processor 105 configured to maximize a power transfer or minimize a signal reflection associated with a message), rate converters (e.g., using processor 105 configured to convert a rate of a message in accordance with the universal protocol), fault isolators (e.g., using processor 105 to determine a fault associated with a message), or signal translators (e.g., using processor 105 to translate a signaling protocol of a source message to the universal protocol). The gateway 123 receives a message (e.g., as part of memory 107) from the message center 121, translates the message (e.g., using the processor 105), and sends the message (e.g., using the processor 105) to the aggregator 125.

The aggregator 125 may include an SMS aggregator or any other computing system configured to maintain direct connections with multiple networks of different service providers. The aggregator 125 may aggregate messages from one or more gateways 123 and then deliver messages to multiple networks. The aggregator 125 may send the message to the appropriate destination device based on the destination address specified as part of the message.

The system 100 (e.g., device 103 or message center 121) may be configured determine a message source in addition to an origination address and a destination address of a message (e.g., SMS message). The origination address may include a long code (e.g., telephone number) or a short code (e.g., abbreviated version of a telephone number) associated with the first device 103. The destination address may include a long code or a short code associated with the destination device 127. The message source may indicate whether the message was generated with a user interface 109 of the first device 103 or a second device 113 in communication with the first device 103 (e.g., using a second application 112 or connection 115).

The system 100 (e.g., message center 121) may be configured to directly route a message to a destination device 127, bypassing components of system 100 for processing efficiency, based on the teleservice ID. The program 108 may be configured to populate the message (e.g., the transaction layer) with a default teleservice ID associated with a message type, a first teleservice ID associated with messages generated from the user interface 109 (e.g., using the first application 110), and a second teleservice ID associated with messages generated from the second device 113 (e.g., using second application 112 or connection 115) that may be associated with a destination device 127. For messages with the default teleservice ID, the system 100 may send the messages to the gateway 123 and the aggregator 125 for default processing. However, for messages with the first or second teleservice ID indicating a destination device 127, the message center 121 may route the message directly to the destination device 127. Thus, the system 100 may be configured to selectively route messages based in part on the teleservice ID as part of the transaction layer.

The program 108 may be configured to authorize the sending of messages to the access network 117 based in part on the message source. For example, the second application 112 may be configured to access contact information of user to promote installation of the second application 112 to one or more destination devices associated with the contact information, which may be unauthorized by a user of the first device 103. The program 108 may be configured to prompt a user to authorize outgoing messages based on the teleservice ID. The program 108 may be configured to block outgoing messages generated from second devices 113 (e.g., from the second application 112 or connection 115). Thus, the system 100 may selectively authorize outgoing messages based on the teleservice ID of the message.

Any portion of system 100 (e.g., devices 103, 113, and 127, message center 121, gateway 123, and aggregator 125) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 103, 113, and 127, message center 121, gateway 123, and aggregator 125) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices (e.g., first device 103), cellular phones, smartphones, super-phones, tablet computers, next generation portable devices, mobile printers, handheld computers, secure voice communication equipment, computer workstations, desktops, notebooks, servers, networking hardware, or some other computing system and/or device.

The database 122 may include one or more databases, data repositories or other data stores. The database 122 may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
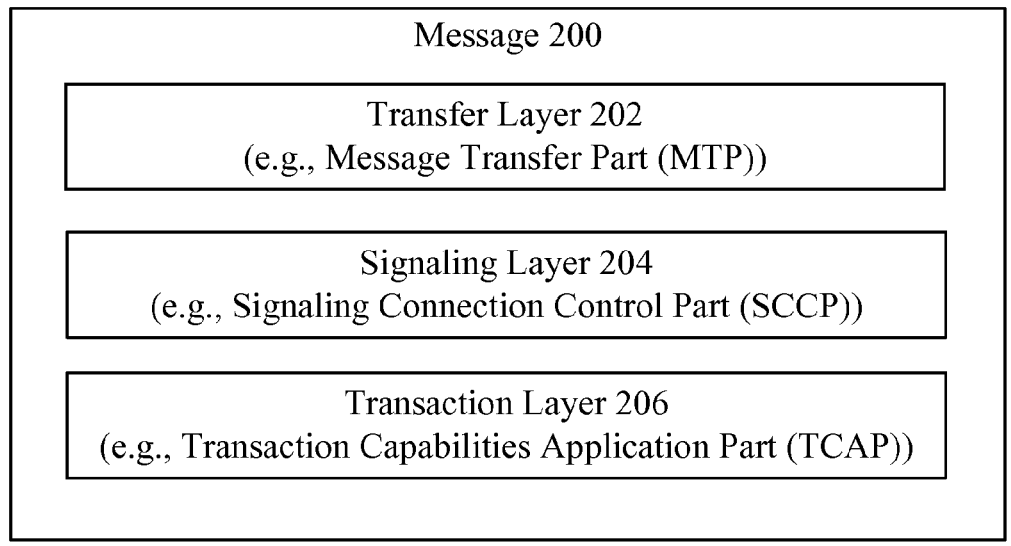
FIG. 2 illustrates an exemplary message, for example an SMS.

FIG. 2 illustrates an exemplary message 200 of the present disclosure. The message 200 may take many different forms and include multiple and/or alternate components and facilities. While an exemplary message 200 is shown in FIG. 2, the exemplary components illustrated in FIG. 2 are not intended to be limiting. Indeed, additional or alternative components and/or implementations may be used.

As illustrated in FIG. 2, the message 200 (e.g., generated by first device 103 or second device 113) may include a transfer layer 202, a signaling layer 204, and a transaction layer 206. The transfer layer 202 may include a protocol (e.g., a message transfer part (MTP)) that is configured to provide basic routing information (e.g., from the first device 103 to the destination device 127) and error detection to provide reliable, unduplicated and in-sequence transport of messages between providers of communication services (e.g., using one or more signaling networks 119). The basic routing information as part of the transfer layer may include the origination address (e.g., generated by the processor 105 of the first device 103) and a destination address (e.g., of the destination device 127 and generated by the processor 105 of the first device 103). Thus, the origination address and the destination address may be read (e.g., by the processor 105 of the first device 103 or the message center 121) from the transfer layer 202.

The signaling layer 204 may include a protocol (e.g., a signaling connection control part (SCCP)) that is configured to extend routing, flow control, segmentation, connection-orientation, and error correction facilities to a signaling network. The signaling layer 204 may rely on the transfer layer for basic routing and error detection. Thus, the signaling layer 204 direct routing of messages as part of the signaling network 119.

The transaction layer 206 may include a protocol (e.g., a transaction capabilities application part (TCAP)) configured to facilitate the transfer of multiple concurrent message dialogs between the first device 103 and the destination device 127. The transaction layer may include a message payload (e.g., message content) and a teleservice ID. The teleservice ID may indicate a message type (e.g., a short message service (SMS), a voicemail notification, a wireless application protocol (WAP), or a Digital-Page file) and may correspond to a signaling protocol (e.g., IS-637 and ANSI-41) of the message center. The teleservice ID may additionally be utilized identify the message source and route the message according the message source.

The system 100 (e.g., device 103 or message center 121) may be configured to determine the origination address, destination address and the message source based in part on one or more portions of the message. The system 100 may be configured to define and utilize at least a portion of the message (e.g., the transaction layer) to determine the message source. Using the message source, the message center 121 may be configured to apply additional routing, priority, billing, and screening features to enhance messaging services.

To determine the message source, the message center 121 may be configured to distinguish between a first message generated from a first device (e.g., using a first application or a user interface as part of the first device 103) and a second message generated from a second device (e.g., using a second application such as background, web, hybrid, or telematics application as part of the first device 103 or a connection with the first device 103). More specifically, a message center 121 may be configured to receive a message 200, access the transfer layer 202, signaling layer 204, and transaction layer 206. The message center 121 may utilize the transfer layer 202 and signaling layer 204, as described above. In addition, the message center 121 may read the teleservice ID as part of the transaction layer 206 and apply additional routing, priority, billing, and screening based on the teleservice ID. Thus, the message center 121 may utilize the transaction layer 206, in addition to the transfer layer 202 and signaling layer 204, to enhance processing of messages.

To facilitate enhanced processing, the program 108 may be configured to populate the transaction layer 206 of messages with a first or second teleservice ID based on whether the message was generated from a first application 110 (e.g., a user interface 109 of the first device 103) or a second application 112 (e.g., in communication with the second device 113). This may be in addition to or to replace a pre-existing or pre-populated default teleservice ID used to indicate a message type. To avoid the default teleservice ID range for indicating the message type, the first or second teleservice IDs for enhanced processing may be selected from a reserved range of the messaging protocol (e.g., IS-637 and ANSI-41). Thus, the teleservice ID may be utilized to distinguish user-generated (e.g., from user interface 109) and machine-generated (e.g., from the second device 113) messages. This may allow for increased accounting and billing associated with machine generated messages, thereby reducing the abuse of the second devices 113 that utilize messaging of devices 103 and facilitating the accurate accounting and billing of unauthorized message distribution.

Figure 3:
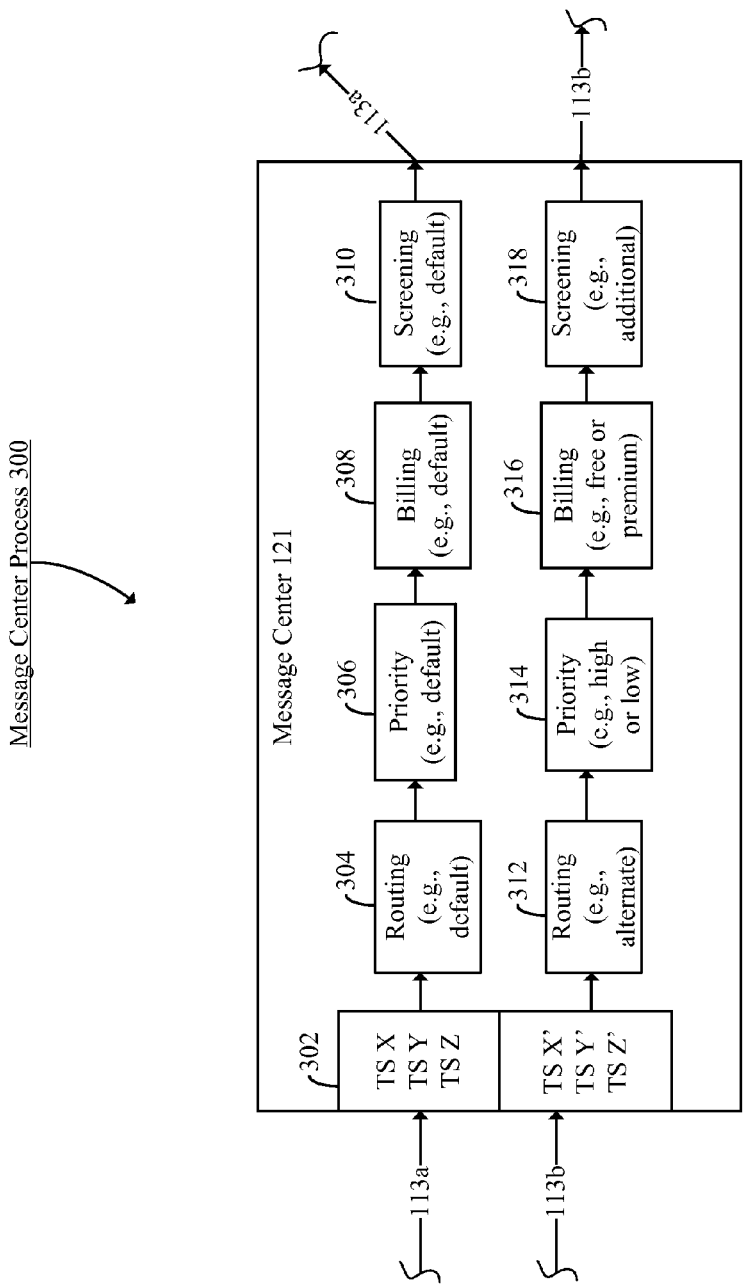
FIG. 3 illustrates an exemplary message center process.

FIG. 3 illustrates an exemplary message center process 300 of the present disclosure. The process 300 may take many different forms and include multiple and/or alternate components and facilities. While an exemplary process 300 is shown in FIG. 3, the exemplary components illustrated in FIG. 3 are not intended to be limiting. Indeed, additional or alternative components and/or implementations may be used.

At decision point 302, the message center 121 (e.g., as part of memory 107 or database 122) receives a message and determines if the message has a default teleservice ID or a first or second teleservice ID. If the message has a default teleservice ID, the message center 121 (e.g., using the processor 105) applies default routing. If the message has a first or second teleservice ID, the message center 121 (e.g., using the processor 105) applies direct routing.

At block 304, the message center 121 (e.g., using processor 105) applies default routing to the message 200 based on the default teleservice ID. For example, the message center 121 (e.g., using the processor 105) may send the message 200 to the gateway 123 and the aggregator 125, as discussed above.

At block 306, the message center 121 (e.g., using processor 105) applies a default priority to the message 200 based on the default teleservice ID. For example, the default priority may include the standard priority applied to the message type according to the protocol of the message center 121.

At block 308, the message center 121 (e.g., using processor 105) applies a default billing to the message based on the default teleservice ID. For example, the default billing may include counting the message 200 against a text messaging service plan or applying a standard text messaging rate.

At block 310, the message center 121 (e.g., using processor 105) applies a default screening is applied to the message 200 based on the default teleservice ID. For example, the default screening may include checking if the transaction layer 206 of the message 200 has been flagged by device 103 or 113 as having offensive or prohibited content.

At block 312, the message center 121 (e.g., using processor 105) applies direct routing based on the first or second teleservice ID. For example, the message center 121 may send the message 200 to the destination device 127, as discussed above.

At block 314, the message center 121 (e.g., using processor 105) applies an alternate priority to the message 200 based on the first or second teleservice ID. For example, the alternate priority may include a high or low priority indicating the processing order or speed (e.g., relative to the default priority) that the message center 121 applies to the message 200.

At block 316, the message center 121 (e.g., using processor 105) applies an alternate billing to the message based on the first or second teleservice ID. For example, the alternate billing may include an increased or decreased relative count of the message 200 against a text messaging service plan or a free or premium text messaging rate.

At block 318, the message center 121 (e.g., using processor 105) applies an alternate screening to the message based on the first or second teleservice ID. For example, the alternate screening may automatically block or reject second teleservice IDs associated with offensive or prohibited content or unauthorized services. After block 318, the process 300 ends.

Figure 4:
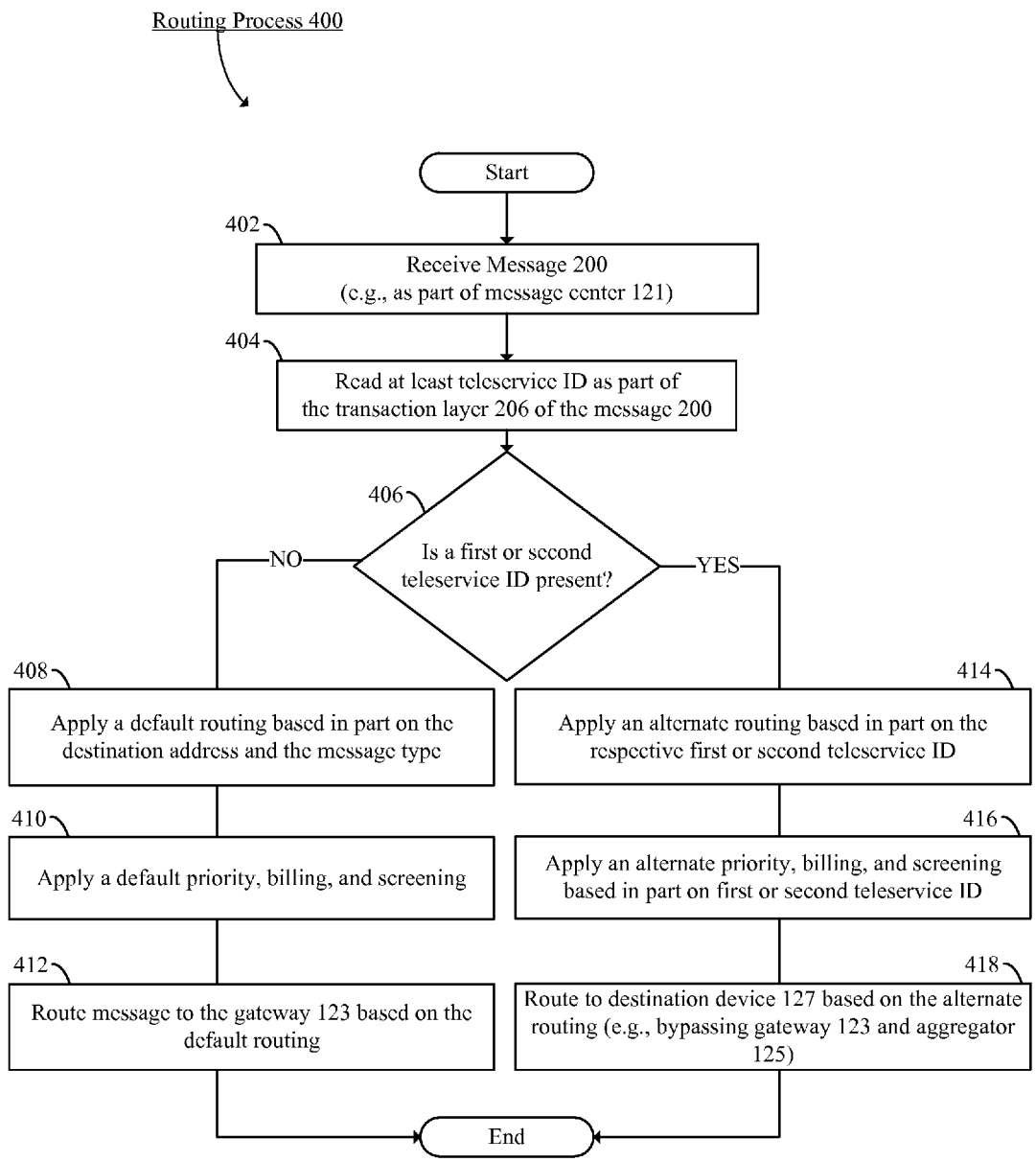
FIG. 4 illustrates an exemplary routing process.

FIG. 4 illustrates an exemplary message center process 400 of the present disclosure. The process 400 may take many different forms and include multiple and/or alternate components and facilities. While an exemplary process 400 is shown in FIG. 4, the exemplary components illustrated in FIG. 4 are not intended to be limiting. Indeed, additional or alternative components and/or implementations may be used.

At block 402, the message 200 is received by the message center 121 (e.g., as part of the memory 107 or database 122).

At block 404, the message center 121 (e.g., using processor 105) reads at least the teleservice ID as part of the transaction layer 206 of the message 200.

At decision point 406, the message center 121 (e.g., using processor 105) determines if the teleservice ID is a default teleservice ID associated with a message type (e.g., not the message source) or a first or second teleservice ID associated with the message source (e.g., first device 103 or the second device 113, respectively). For example, the first teleservice ID may indicate that the message was generated from the first application 110 or the user interface 109 of the first device 103. Alternatively, the second teleservice ID may indicate that the message was generated from the second application 112 or the connection 115 with the second device 113. If the teleservice ID is not associated with the first device 113 or the second device 113, the message center 121 applies default routing based on the destination address as part of the transfer layer 202, for example, to send the message to gateway 123, as discussed above. If the teleservice ID is associated with the first device 103 or the second device 113, the message center 121 may apply an alternate routing to the destination device 127 based in part on the respective first or second teleservice ID as part of the transaction layer 206, for example, in addition to the destination address of the transfer layer 202. Thus, the message center 121 (e.g., using processor 105) determines if a default, first, or second teleservice ID is associated with the message and, in response, applies a routing, priority, billing, and screening to the message based on the teleservice ID.

At block 408, the message center 121 (e.g., using processor 105) applies a default routing based in part on the destination address as part of the transfer layer 202 and the message type indicated by the default teleservice ID as part of the transaction layer 206, as discussed above. For example, the transaction layer 206 may include a default teleservice ID associated with the message type (e.g., SMS), but may not be associated with the message source (e.g., first device 103 or the second device 113). Thus, if the default teleservice ID is present, the default routing is applied based on the destination address and the message type.

At bock 410, the message center 121 (e.g., using processor 105) may apply a default priority, billing, and screening to the message based in part on the destination address as part of the transfer layer 202 and the message type, as discussed above. For example, the default priority, billing, and screening may be applied because the default teleservice ID may be associated with a message type and may not give an indication of the message source (e.g., first device 103 or second device 113).

At block 412, the message center 121 (e.g., using processor 105) routes the message to the gateway 123 based on the default routing, as discussed above.

At block 414, the message center 121 applies an alternate routing to the message based in part on the first or second teleservice ID as part of the transaction layer 206, as discussed above. For example, the alternative priority, billing, and screening may be applied because the first or second teleservice ID indicates that the message source is the first device 103 or second device 113, respectively.

At block 416, the message center 121 (e.g., using processor 105) may apply an alternate priority, billing, and screening based in part on the first or second teleservice ID.

At block 418, the message center 121 (e.g., using processor 105) routes the message to the destination device 127 based on the alternate routing, for example, bypassing the gateway 123 and the aggregator 125. After block 418, the process 400 ends.

Figure 5:
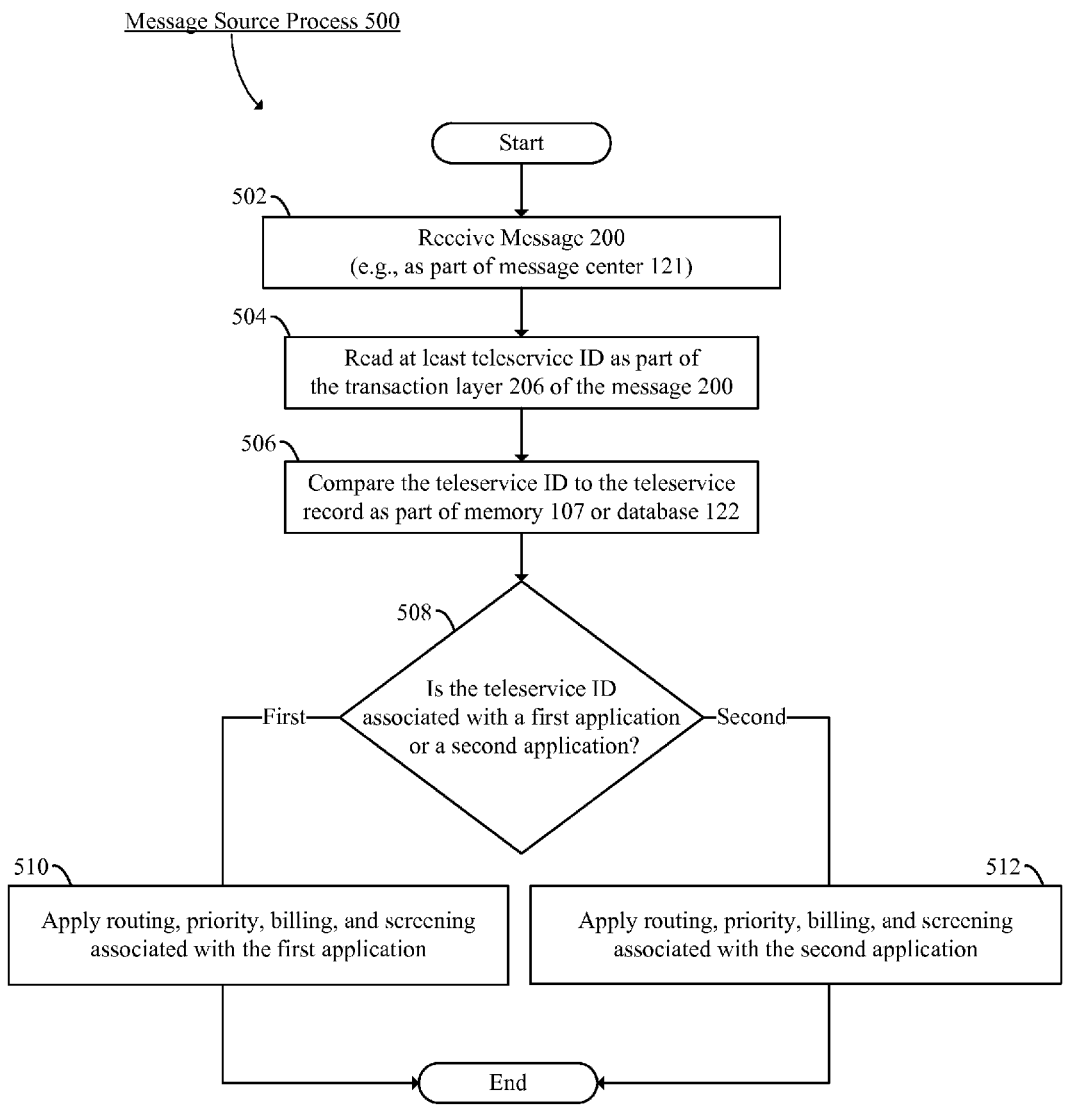
FIG. 5 illustrates an exemplary message source process.

FIG. 5 illustrates an exemplary message source process 500 of the present disclosure. The process 500 may take many different forms and include multiple and/or alternate components and facilities. While an exemplary process 500 is shown in FIG. 5, the exemplary components illustrated in FIG. 5 are not intended to be limiting. Indeed, additional or alternative components and/or implementations may be used.

At block 502, the message 200 is received by the message center 121 (e.g., as part of the memory 107 or database 122).

At block 504, the message center 121 (e.g., using processor 105) reads at least the teleservice ID as part of the transaction layer 206 of the message 200.

At block 506, the message center 121 (e.g., using processor 105) compares the teleservice ID to the teleservice record as part of the memory 107 or database 122.

At decision point 508, the message center 121 (e.g., using processor 105) determines if the teleservice ID is a first teleservice ID associated with a first application or second teleservice ID associated with the second application, as described above.

At block 510, the message center 121 (e.g., using processor 105) applies routing, priority, billing, and screening associated with the first application.

At bock 512, the message center 121 (e.g., using processor 105) applies routing, priority, billing, and screening associated with the second application. After block 512, the process 500 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A message center for source-based message routing, the system comprising:
   a message center processor and a message center memory communicatively connected to the message center processor, the message center processor being configured to:
   receive, as part of the message center memory, a first message generated by a first device processor of a first device, the first message having a first message transfer layer indicating a first destination address and a first message transaction layer, wherein the first message transaction layer includes a default teleservice ID, populated by the first device processor, indicating a message type associated with a default routing;
   receive, as part of the message center memory, a second message generated by a second device processor of a second device, the second message having a second message transfer layer indicating a second destination address and a second message transaction layer indicating an alternate routing, wherein the second message transaction layer includes a second teleservice ID, populated by the first device processor, indicating the alternate routing;
   read at least the first message transfer layer of the first message;
   read at least the second message transaction layer of the second message;
   route the first message based in part on the first destination address of the first message transfer layer; and
   route the second message based in part on the second destination address of the second message transfer layer and the alternate routing of the second message transaction layer.

2. The message center of claim 1, wherein the first message transaction layer indicates that the first message was generated by a first application of a first device using the first device processor and
   wherein the second message transaction layer indicates that the second message was received by a second application of the first device and generated by the second device using the second device processor.

3. The message center of claim 2, wherein the first application is configured to receive the first message from a user interface of the first device and wherein the second application is configured to receive the second message from a connection with the second device.

4. The message center of claim 1, the message center processor further being configured to: apply a default priority to the first message and an alternate priority to the second message.

5. The message center of claim 1, the message center processor further being configured to: apply a default billing to the first message and an alternate billing to the second message.

6. The message center of claim 1, the message center processor further being configured to: apply a default screening to the first message and an alternate screening to the second message.

7. A non-transitory computer-readable medium tangibly embodying computer-executable instructions being executable by a message center processor of a message center to provide operations comprising:
   receive a first message generated by a first device processor of a first device, the first message having a first message transfer layer indicating a first destination address and a first message transaction layer, wherein the first message transaction layer includes a default teleservice ID, populated by the first device processor, indicating a message type associated with a default routing;
   receive a second message generated by a second device processor of a second device, the second message having a second message transfer layer indicating a second destination address and a second message transaction layer indicating an alternate routing, wherein the second message transaction layer includes a second teleservice ID, populated by the first device processor, indicating the alternate routing;
   read at least the first message transfer layer of the first message;
   read at least the second message transaction layer of the second message;

route the first message based in part on the first destination address of the first message transfer layer; and
route the second message based in part on the second destination address of the second message transfer layer and the alternate routing of the second message transaction layer.

8. The medium of claim 7, wherein the first message transaction layer indicates that the first message was generated by a first application of a first device using the first device processor and
wherein the second message transaction layer indicates that the second message was received by a second application of the first device and generated by the second device using the second device processor.

9. The medium of claim 8, wherein the first application is configured to receive the first message from a user interface of the first device and wherein the second application is configured to receive the second message from a connection with the second device.

10. The medium of claim 7, the operations further comprising: apply a default priority to the first message and an alternate priority to the second message.

11. The medium of claim 7, the operations further comprising: apply a default billing to the first message and an alternate billing to the second message.

12. The medium of claim 7, the operations further comprising: apply a default screening to the first message and an alternate screening to the second message.

13. A method comprising:
receiving a first message generated by a first device processor of a first device, the first message having a first message transfer layer indicating a first destination address and a first message transaction layer, wherein the first message transaction layer includes a default teleservice ID, populated by the first device processor, indicating a message type associated with a default routing;
receiving a second message generated by a second device processor of a second device, the second message having a second message transfer layer indicating a second destination address and a second message transaction layer indicating an alternate routing, wherein the second message transaction layer includes a second teleservice ID, populated by the first device processor, indicating the alternate routing;
reading at least the first message transfer layer of the first message;
reading at least the second message transaction layer of the second message;
routing the first message based in part on the first destination address of the first message transfer layer; and
routing the second message based in part on the second destination address of the second message transfer layer and the alternate routing of the second message transaction layer.

14. The method of claim 13, wherein the first message transaction layer indicates that the first message was generated by a first application of a first device using the first device processor and
wherein the second message transaction layer indicates that the second message was received by a second application of the first device and generated by the second device using the second device processor.

15. The method of claim 14, wherein the first application is configured to receive the first message from a user interface of the first device and wherein the second application is configured to receive the second message from a connection with the second device.

16. The method of claim 13, further comprising: applying a default priority to the first message and an alternate priority to the second message.

17. The method of claim 13, further comprising: applying a default billing to the first message and an alternate billing to the second message.

* * * * *